July 27, 1954    F. HINDEN    2,684,611
OBJECTIVE MOUNT WITH BUILT-IN FILTERS
Filed Feb. 12, 1952    3 Sheets-Sheet 1

INVENTOR.
FRITZ HINDEN
BY
ATTORNEY

July 27, 1954          F. HINDEN          2,684,611
OBJECTIVE MOUNT WITH BUILT-IN FILTERS
Filed Feb. 12, 1952          3 Sheets-Sheet 2
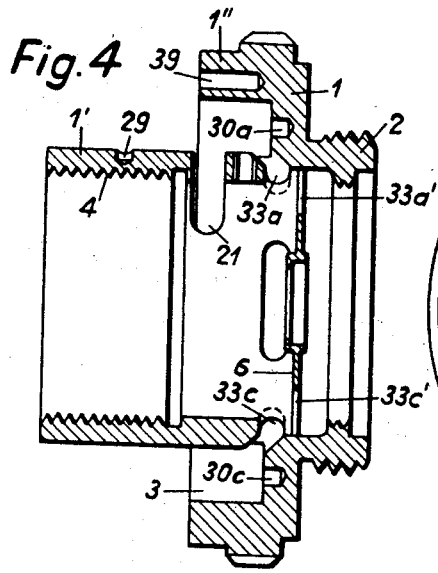
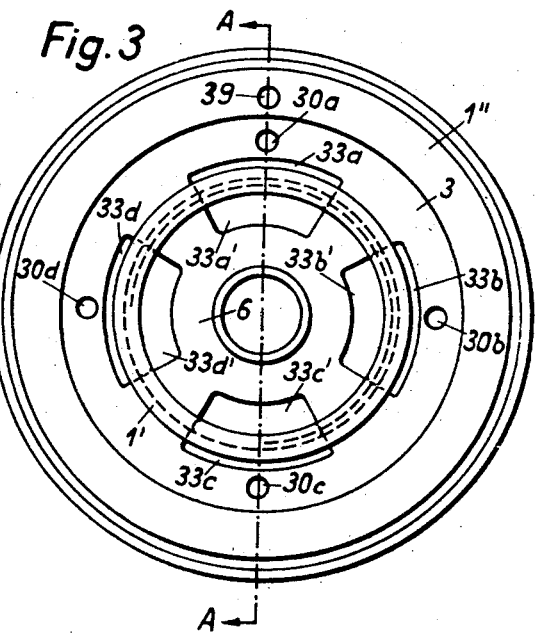
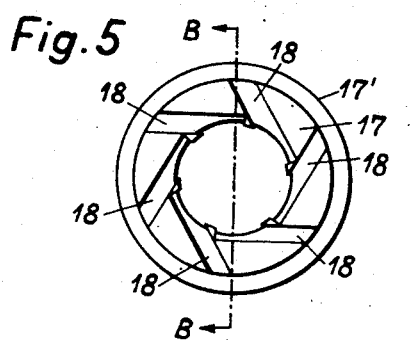
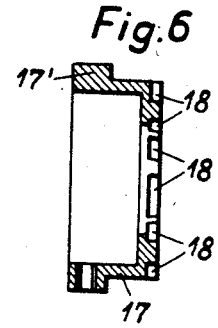
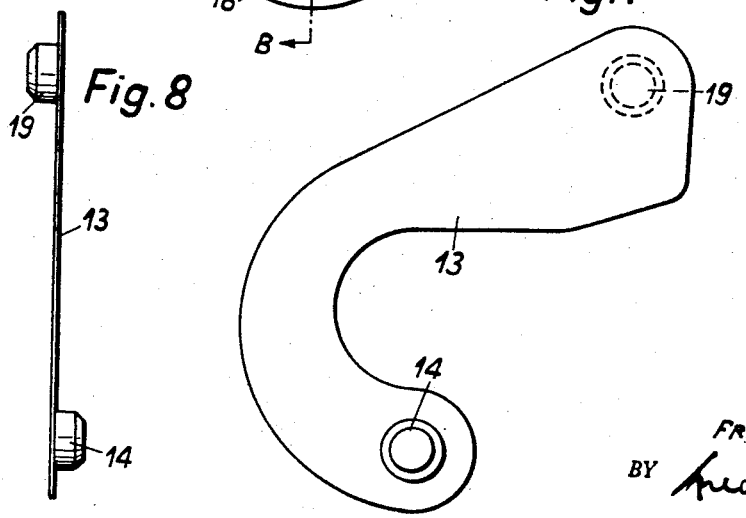
INVENTOR.
FRITZ HINDEN
BY
ATTORNEY July 27, 1954    F. HINDEN    2,684,611
OBJECTIVE MOUNT WITH BUILT-IN FILTERS
Filed Feb. 12, 1952    3 Sheets-Sheet 3

INVENTOR.
FRITZ HINDEN
BY
ATTORNEY

Patented July 27, 1954

2,684,611

UNITED STATES PATENT OFFICE 2,684,611

OBJECTIVE MOUNT WITH BUILT-IN FILTERS

Fritz Hinden, Aarau, Switzerland

Application February 12, 1952, Serial No. 271,145

12 Claims. (Cl. 88—113)

This invention relates to mounts for photographic objectives with built-in filters selectively movable into positions concentric with the optical axis of the objective.

As is well known, photographic pictures can be appreciably improved in certain instances by employing filters with different colors or hues in accordance with the desired effect.

It is already known to mount such filters in mounts which can be fitted or threaded upon the camera objective. However, such an arrangement is inconvenient and time-consuming in particular when sun shades are simultaneously used which generally must be removed before the filter mounts can be attached.

To facilitate the carrying, fitting, and exchange of filters, it has been proposed to arrange the filters in a circle on a disc eccentrically rotatable about the optical axis of the objective so that by rotation of this disc different filters can be moved into the position of use in the manner of the different diaphragm openings of a diaphragm of the revolving type. The difficulty with such an eccentric disc is that it requires considerable space and that the lens barrel or mount of the objective must have an abnormally large outer diameter when the disc is to be disposed entirely within the objective mount. With eccentric discs of this type one of the openings is not occupied by a filter so that pictures without use of a filter can be taken when this opening is in alignment with the objective axis. However, the disadvantage of this arrangement is that in certain instances the photographer must rotate all the filters past the objective before he reaches the opening without a filter.

One of the objects of the present invention is to provide an objective mount with built-in filters which permits moving any one of these filters into its operative position, that is, into the position concentric with the optical axis without necessitating an inconvenient and unsightly increase in the outer configuration of the mount and without requiring a repeated or time-consuming manipulation of the filters before either the desired filter is placed in position of use or no filter is in front of the objective.

According to the invention, the aforementioned and other objects, features and advantages of the invention are attained by providing two rings, one fixed and the other rotatable, within the mount in positions concentric with the optical axis of the objective and by pivotally supporting a plurality of the filter carriers on one of said rings in positions circumferentially spaced about the optical axis of the objective. Each of the filter carriers is operatively coupled with control means which are controlled by the relative rotational position of the two rings so that any one of the filter carriers can be pivoted either into a position concentric with the optical axis of the objective or into a position outside the incident light beams passing through the objective.

According to a now preferred embodiment of the invention, each of the filter carriers pivotally supported on one of the rings is provided with a guide pin which guide pins engage a guiding groove in the other ring. This guiding groove is generally in the form of a circle concentric with the optical axis but includes a flattened or otherwise radially bent-in section. The filter carriers and their guide pins are disposed in a spatial relationship with the guiding groove so that a filter carrier the guide pin of which engages said flattened groove section, particularly the center thereof, is pivoted in a position concentric with the optical axis whereas all the other filter carriers the guide pins of which engage the circular section of the guiding groove are pivoted in a position in which they are located outside the incident light beams through the objective, the positions of the guide pins in the guiding groove and, hence, of the filter carriers relative to the optical axis being controlled by a rotation of the rotatable ring.

The center angle defined by the ends of the flattened groove section is preferably so selected that a filter carrier is moved completely from its operative position concentric with the optical axis into its inoperative position before one of the adjacent filter carriers reaches the flattened groove section and begins to move toward its operative position when the two rings are rotated relative to each other. The two rings are preferably provided with detents, more specifically, twice as many detents are preferably provided than there are filter carriers so that there is a detained position of the two rings in which none of the filter carriers is in the operative position between each two relative positions of the two rings, as determined by one of the dentents, in which one of the filter carriers is in position of use.

It is advantageous to support the filter carriers on the support ring or barrel of the objective and to provide the guiding groove in a filter carrier setting ring which is rotatably mounted on the support ring for the objective.

As is well known, each filter carried by one of the carriers absorbs a certain amount of light.

Consequently, when a filter is used the exposure time must be increased in accordance with the amount of light absorbed by the respective filter. In other words, the opening of the objective is in effect reduced. The period of time by which the exposure time must be increased when a filter is employed is sometimes referred to as the "time extension factor of the filter." It was hitherto necessary to ascertain this time extension factor from a table and then to take the same in account when the exposure time is calculated. This additional operation causes frequently mistakes in the calculation of the exposure time.

According to another object of the invention the aforementioned additional operation is eliminated by providing filter setting indicia on the circumference of the filter setting ring which indicia indicate which one of the filters is in its operative position and serve simultaneously as a marker for a diaphragm setting ring with a diaphragm scale thereon. These indicia, in addition to the actually set opening of the diaphragm, show on the diaphragm scale of the diaphragm setting ring the diaphragm opening reduced by a value corresponding to the time extension factor of the filter placed in the position of use. As previously explained, it is this reduced opening of the diaphragm which must be taken in account to obtain the correct exposure time.

Other and further objects, features and advantages of the invention will be pointed out hereinafter and set forth in the appended claims forming part of the application.

In the accompanying drawing several now preferred embodiments of the invention are shown by way of illustration and not by way of limitation.

In the drawings:

Fig. 3 is a plan view of the support ring of the objective mount, as seen in the direction of the incident light.

Fig. 4 is a section taken on line A—A of Fig. 3.

Fig. 5 is a plan view of the notch ring of the diaphragm of the objective, as seen from the side of the camera.

Fig. 6 is a section taken on line B—B of Fig. 5.

Fig. 7 is a plan view of one of the leaves of the diaphragm on an enlarged scale.

Fig. 8 is a side view of Fig. 7.

Figure 1:
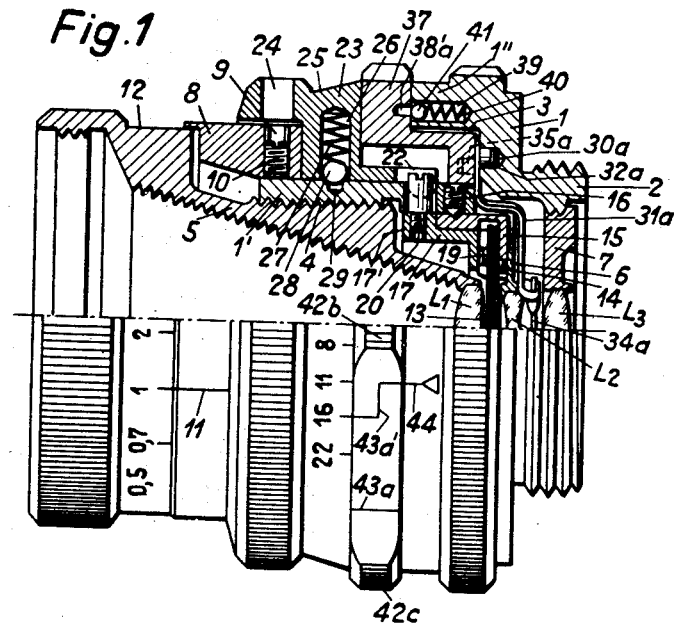
Fig. 1 is a side view, partly in section, of an objective mount equipped with four filters mounted for selective setting.

Referring now to the figures in detail, the exemplified objective mount comprises an objective support ring 1 which forms an externally threaded flange 2 on its side facing the camera. The ring is provided with an annular groove 3 on the side of the incident light. On the same side ring 1 is flanged to form a ring portion 1' of reduced diameter. Ring portion 1' is provided with an internal thread 4 into which a focussing or distance setting ring or lens barrel 5 can be threaded. The objective proper comprises three lens components $L_1$, $L_2$ and $L_3$. Component $L_1$ is mounted in ring 5 on the camera side thereof; component $L_2$ is held by a bearing ring member 6 of ring 1; and component $L_3$ is mounted in a ring member 7 threaded in ring 1. A ring 8 is fitted upon the inner portion 1' of ring 1. As can best be seen on Fig. 1, ring portion 1' which protrudes axially beyond an outer portion 1'' of ring 1 supports a ring 8 secured upon the inner ring portion 1' of ring 1 against rotation and axial displacement by means of a screw 10 screwed in a threaded bore 9 extending vertically relative to the axis of the objective mount. Ring 8 has thereon a focussing mark 11 which cooperates with a range scale provided on the adjacent cylindrical surface 12 of the focussing ring 5. Between the lens components $L_1$ and $L_2$, there is disposed a diaphragm of the iris type the leaves 13 of which are pivotally mounted by means of a pivot 14 to a support ring 15 for the diaphragm which ring has an angular profile as can best be seen on Fig. 1. This ring 15 is fitted in the rear end of the inner portion 1' of ring 1 and secured in portion 1' against axial displacement and rotation by means of a screw 16. The leaves 13 of the diaphragm are pivoted by means of a notched ring 17 which has also an angular profile. Ring 17 is provided on its side juxtaposed to the support ring 15 for the diaphragm with notches 18, one for each leaf 13. Each leaf is guided in the respective notch 18 by means of a bolt 19. The notch ring 17 is rotatably mounted in the support ring 15 and provided with a flange portion 17' protruding beyond ring 15. This ring portion 17' includes a radially extending threaded bore in which is threaded a screw bolt 20. Bolt 20 is fitted in a transverse slot 21 in the inner portion 1' of ring 1. This transverse slot occupies approximately one-third of the circumference of inner ring portion 1'. Bolt 20 is further held in a longitudinal slot 22 in the rear end of a ring 23 for adjustment of the diaphragm opening. Ring 23 is rotatably mounted upon the inner ring portion 1' of ring 1 so as to abut against ring 8 and also to protrude over the same. The portion of ring 23 protruding over ring 8 is provided at a point of its circumference with a radially directed bore 24 through which screw 10 can be inserted which, as previously mentioned, serves to secure ring 8 upon the inner portion 1' of ring 1.

The spacing of notches 18 of the notch ring 17 and the configuration of leaves 13 are so selected that the individual calibration lines of the diaphragm scale provided on a conical annular surface 25 of the diaphragm setting ring 23 are equally spaced. Diaphragm setting ring 23 has in the cylindrical surface with which it is seated upon the inner ring portion 1' of ring 1 a bore 26 ending within the ring material. A ball 28 guided in bore 26 is engageable by the action of a loaded spring 27 with detents 29 in the circumference of the inner ring portion 1' of ring 1, one detent 29 being provided for each scale marking of the diaphragm scale. As a result, the diaphragm setting ring 23 is retained by the respective detent in each position corresponding to one of the calibration markings of the diaphragm scale.

Figure 2:
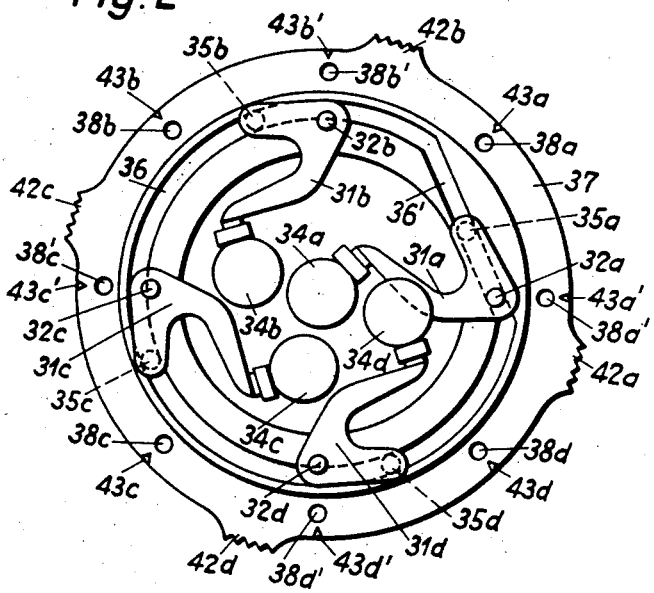
Fig. 2 is a front view of the filters and the means for supporting and setting the same, as seen from the side of the camera.

As can best be seen on Figs. 3 and 4, four bores 30a, 30b, 30c and 30d extend parallel to the axis of the objective from the base of annular groove 3 of ring 1. In each of these bores, there is journalled a pivot pin 32a, 32b, 32c and 32d respectively secured to the knee of a filter carrier 31a, 31b, 31c and 31d in the form of a bell crank lever the configuration of which can best be seen on Fig. 2. The longer arm of each bell crank is bent twice at a right angle and reaches through a slot 33a, 33b, 33c and 33d respectively in the base of annular groove 3 of ring 1 and also through corresponding openings 33a', 33b', 33c' and 33d' respectively of the mounting ring 6 into the space between the mounting rings 6 and 7 and between the lens components $L_2$ and $L_3$ respectively. The end of the longer arm of each filter carrier 31a, 31b, 31c and 31d supports one of four different filters 34a, 34b, 34c and 34d respectively. The shorter arm of each filter carrier supports a guide pivot 35a, 35b, 35c and 35d respectively. These guide pivots are guided in a curved guiding groove 36 of a filter setting ring 37 rotatably disposed between the outer ring portion 1'' of ring 1 and the diaphragm setting ring 23. Ring 37 has eight detents 38a, 38a', 38b, 38b', 38c, 38c', 38d and 38d' in its surface abutting against a face surface of ring portion 1'' of ring 1. These detents are uniformly circumferentially spaced on a circle concentric with the axis of the objective mount. Ring portion 1'' of ring 1 is further provided with a bore 39 ending within the material of the ring and extending parallel to the axis of the objective mount. A ball 41 guided in bore 39 is engageable by means of a loaded spring 40 with the said detents 38a, 38a', 38b, 38b', 38c, 38c', 38d and 38d'. The curved groove 36 of filter setting ring 37 is in the form of a circle concentric to the axis of the objective mount for the largest portion of its length but is flattened or otherwise bent inwardly in its section 36', as can best be seen on Fig. 2. The filter carriers 31a, 31b, 31c and 31d, the guide pivots 35a, 35b, 35c and 35d of which are positioned in the circular section of curved groove 36 of the filter setting ring 37 are outwardly pivoted so that the respective filters 34a, 34b, 34c and 34d are disposed outside the light beams between the lens components $L_2$ and $L_3$. If now ring 37 be rotated into a position so that one of the guide pivots 35a, 35b, 35c or 35d is located in the middle of the flattened section 36' of guiding groove 36, the respective filter carrier 31a, 31b, 31c or 31d is inwardly pivoted. As a result, the filter 34a, 34b, 34c or 34d of the respective carrier is moved into a position concentric with the optical axis of the objective. It will now be apparent that by a rotation of the filter setting ring 37 through an angle of 45° in one or the other direction, the respective guide pivot 35a, 35b, 35c or 35d is moved out of section 36' of the curved groove whereby the respective filter carrier 31a, 31b, 31c or 31d is again outwardly pivoted. The center angle defined by the ends of flattened section 36' of curved groove 36 is so selected that a guide pin 35a, 35b, 35c or 35d which is situated in the center of groove section 36' when filter setting ring 37 is in engagement with one of the detents, is moved completely out of groove section 36' by a rotation of ring 37 into an adjacent detent engaging position, that is through an angle of 45°, without one of the adjacent guide pivots 35a, 35b, 35c or 35d entering groove section 36'.

Filter setting ring 37 has on its circumference four toothed portions 42a, 42b, 42c and 42d which divide the circumference of ring 37 in four equal sectors. As was previously explained, detents 38a, 38a', 38b, 38b', 38c, 38c', 38d and 38d' provide for eight predetermined detained positions of ring 37. Accordingly, two filter setting indicia are marked in each sector of the circumference of ring 37. These indicia 43a, 43a', 43b, 43b', 43c, 43c', 43d and 43d' coact with a marker 44 on the cylindrical surface of ring portion 1'' of ring 1 adjacent to filter setting ring 37. They also serve as setting marks for a diaphragm scale provided on the annular surface 25 of diaphragm setting ring 23 adjacent to filter setting ring 37. The filter setting indicia 43a, 43b, 43c and 43d are each in form of a straight line parallel to the axis of the objective mount. When any one of these last mentioned indicia is in registry with marker 44 on ring section 1'' of ring 1, none of the filters is set for operation. The filter setting indicia 43a', 43b', 43c' and 43d' are each in form of a line twice bent at a right angle. The section of these bent indicia adjacent to ring portion 1'' of ring 1 serves for adjustment of filter setting ring 37 relative to the filter setting marker 44. Consequently, when one of the said sections of the bent indicia 43a', 43b', 43c' or 43d' is placed in registry with the setting marker 44 the respective filter is set for use. The circumferential displacement of the section of each indicia 43a', 43b', 43c' and 43d' respectively relative to the indicia section used for setting of filter setting ring 37 corresponds to the time extension factor of the associated filter 34a, 34b, 34c and 34d respectively. In other words, the aforesaid displaced sections of the indicia do not indicate on the diaphragm scale of the diaphragm setting ring 23 the diaphragm opening actually set but a smaller diaphragm opening which requires an exposure time corresponding to the exposure time of the actually set diaphragm aperture when taking in account the absorption of light by the operative filter 34a, 34b, 34c and 34d respectively.

Figure 9:
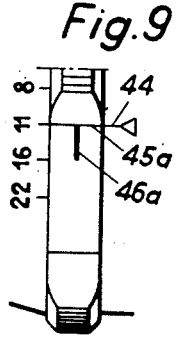
Fig. 9 is a modification of the setting indicia of the means for setting the filters.

In the modification according to Fig. 9, the bent filter setting indicia 43a', 43b', 43c' and 43d' are replaced by unbroken lines 45a, 45b, 35c and 45d each provided with a lateral radial extension 46a, 46b, 46c and 46d the length of which corresponds to the time extension factor of the respective filter 34a, 34b, 34c and 34d. The unbroken lines 45a, 45b, 45c and 45d indicate the actually set diaphragm opening on the diaphragm scale of diaphragm setting ring 23 and the ends of the extension lines 46a, 46b, 46c and 46d indicate the diaphragm opening which must be taken in account when the exposure time is to be ascertained by reason of the absorption of light by the filter 34a, 34b, 34c or 34d set in its position of use.

It may be advantageous to color the filter setting indicia 43a', 43b', 43c' and 43d' in accordance with the associated filters 34a, 34b, 34c and 34d respectively. The filter setting indicia 45a, 45b, 45c and 45d with their extensions 46a, 46b, 46c, 46d may also be accordingly colored. It is also possible to mark the color of each filter next to the respective setting mark on the filter setting ring 37 or the sectors of the filter setting ring 37 can be colored in accordance with the colors of the associated filters.

In certain instances it is desirable to provide so many different filters that the disposition of these filters in one plane may cause difficulties. In such case the filters can be arranged in two groups that are axially displaced relative to each other.

Figure 10:
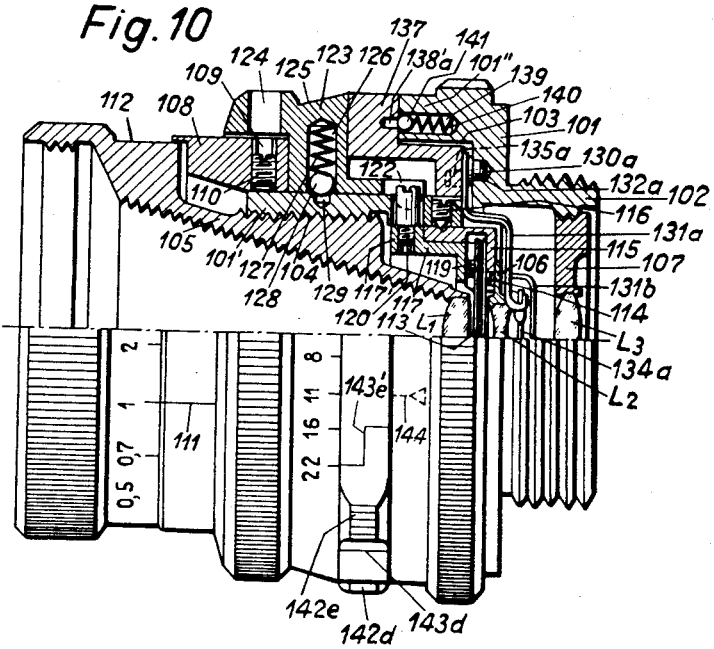
Fig. 10 is a side view, partly in section, of a modification of an objective mount equipped with means according to the invention for selective setting of filters.
Figure 11:
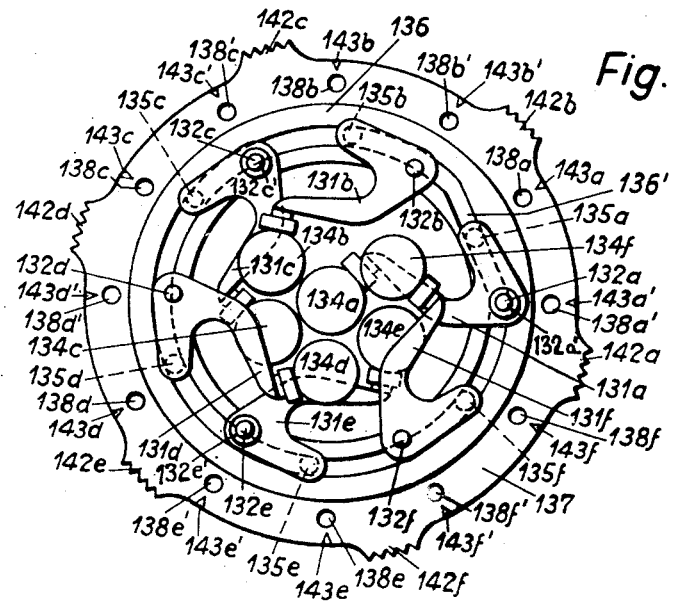
Fig. 11 is a front view of the filters and the means for supporting and setting the same according to Fig. 10, as seen from the side of the camera.

Figs. 10 and 11 show an arrangement of this type for six filters and the means for selectively setting the same. The general arrangement and the operation of the objective mount according to Figs. 10 and 11 correspond to the arrangement and the operation of the objective mount according to Figs. 1 to 9 and the corresponding components are designated by the same numerals though increased by 100.

There are provided six filter carriers 131a, 131b, 131c, 131d, 131e, and 131f each in form of a bell crank lever. The longer arm of each carrier supports one of six different filters 134a, 134b, 134c, 134d, 134e and 134f. Each filter carrier is pivotally guided by means of a pivot pin 132a, 132b, 132c, 132d, 132e and 132f respectively which pivot pins engage bores 130a, 130b, 130c, 130d, 130e and 130f respectively in the base of an annular groove 103 of the bearing ring 101. The shorter arm of each filter carrier supports a guide pivot 135a, 135b, 135c, 135d, 135e and 135f respectively. All these guide pins are guided in a curved groove 136 of a filter setting ring 137 which is rotatably mounted between the outer portion 101″ of bearing ring 101 and a diaphragm setting ring 123. The filter setting ring 137 has in its surface abutting against the end surface of outer portion 102″ of bearing ring 101 twelve detents 138a, 138a', 138b, 138b', 138c, 138c', 138d, 138d', 138e, 138e', 138f and 138f' which are uniformly distributed on the circumference of a circle concentric with the axis of the objective mount. The outer ring portion 101″ is further provided with a bore 139 parallel to the axis of the objective mount and ending within the material of ring 101. A ball 141 is guided within this latter bore and biased by a loaded spring 140 toward engagement with one of the detents. The curved groove 136 of filter setting ring 137 is generally in form of a circle concentric with the axis of the objective mount but provided with a flattened portion 136'.

Those filter carriers 131a, 131b, 131c, 131d, 131e and 131f, the guide pivots 135a, 135b, 135c, 135d, 135e and 135f of which are positioned within the circular portion of the curved groove 136 of the filter setting ring 137 are outwardly pivoted so that the filters 134a, 134b, 134c, 134d, 134e and 134f supported by them are located outside the light beams between the lens components $L_2$ and $L_3$.

If now the filter setting ring 137 is rotated into a position in which one of the guide pivots 135a, 135b, 135c, 135d, 135e or 135f is positioned in the middle of the flattened groove section 136' of groove 136, the respective filter carrier 131a, 131b, 131c, 131d, 131e or 131f is inwardly pivoted so that the filter supported by the respective filter carrier is moved into a position concentric with the optical axis of the objective mount. The center angle defining groove section 136' is so selected that a guide pivot 135a, 135b, 135c, 135d, 135e or 135f positioned in the middle of flattened groove section 136' when filter setting ring 137 is in one of its detained positions is moved completely out of the groove section 136' upon rotation of the filter setting ring 137 into an adjacent position, that is, through an angle of 30°. A continued rotation of the filter setting ring 137 through an angle 30° and in the same direction then moves the next following guide pivot 135a, 135b, 135c, 135d, 135e or 135f into the middle of groove section 136'.

The longer arm of filter carriers 131a, 131b, 131c, 131d, 131e and 131f each of which supports one of the filters 134a, 134b, 134c, 134d, 134e and 134f is twice bent off at a right angle and each longer arm reaches through a slot 133a, 133b, 133c, 133d, 133e and 133f respectively in the base of the annular groove 103 of bearing ring 101 and through corresponding openings 133a', 133b', 133c', 133d', 133e' and 133f' respectively of a bearing ring member 106 into the space between the rings 106 and 107 and between the lens components $L_2$ and $L_3$ respectively.

The filter carriers 131a, 131b, 131c, 131d, 131e, and 131f with the filters 134a, 134b, 134c, 134d, 134e and 134f are divided in two groups, one group including the filter carriers 131a, 131c and 131e with the respective filters and the other group the filter carriers 131b, 131d and 131f with the respective filters. The pivot pins 132a, 132c and 132e of the filter carriers 131a, 131c and 131e are each provided with a distance or focusing ring 132a', 132c' and 132e' respectively which rings abut against the base of annular groove 103 and serve to space the filter carriers 131a, 131c and 131e from the base of the annular groove 103 of bearing ring 101. The pivot pins 132b, 132d and 132f are not provided with such distance or focusing rings so that the respective filter carriers 131b, 131d and 131f abut directly against the base of annular groove 103. The distance between a pivot pin and the first bent-off portion of the respective filter carrier is somewhat larger with the filter carriers 131a, 131c and 131e than it is with the filter carriers 131b, 131d and 131f so that the section of the filter carriers 131a, 131c, 131e which is parallel to the optical axis of the objective mount is somewhat closer to this axis than the corresponding section of filter carriers 131b, 131d and 131f. As a result, adjacent filter carriers can be pivoted without interfering with each other. The section of the filter carriers 131b, 131d, 131f parallel to the axis of the objective mount is slightly longer than the corresponding section of the filter carriers 131a, 131c and 131e so that the filters 134b, 134d, and 134f are axially displaced toward the camera side of the objective relative to the filters 134a, 134c and 134e. As a result, the filter carriers and filters do not interfere with each other when pivoted.

The filter setting ring 137 is provided on its circumference with six toothed portions 142a, 142b, 142c, 142d, 142e and 142f which divide the circumference of the filter setting ring 137 in six equal sectors. As previously explained, detents 138a, 138b, 138c, 138d, 138e and 138f provide for twelve predetermined detained positions of filter setting ring 137. Accordingly, two filter setting indicia are marked in each sector of the circumference of ring 137. These indicia 143a, 143a', 143b, 143b', 143c, 143c', 143d, 143d', 143e, 143e', 143f and 143f' coact with a marker 144 on the cylindrical surface of ring portion 101″ of bearing ring 101. They also serve as setting marks for a diaphragm scale provided on the annular surface 125 of the diaphragm setting ring 123 adjacent to filter setting ring 137. The filter setting indicia 143a, 143b, 143c, 143d, 143e and 143f are each in form of a straight line parallel to the axis of the objective mount. When any one of these last mentioned six indicia is in registry with marker 144 on ring section 101″ of ring 101, none of the filters is set for operation. The filter setting indicia 143a', 143b', 143c', 143d', 143e' and 143f' are each in form of a line twice bent at a right angle. The portion of these bent indicia adjacent to ring portion 101″ serves for adjustment of filter setting ring 137 relative to the filter setting mark 144. Consequently, when one of the said sections of the bent indicia 143a', 143b', 143c', 143d', 143e' and 143f' is placed in registry with the setting marker 144, the respective filter 134a, 134b, 134c, 134d, 134e or 134f is set for use. The circumferential displacement of the portion of each indicia 143a', 143b', 143c', 143d', 143e' and 143f' relative to the indicia section that is used for setting of filter setting ring 137 corresponds to the time extension factor of the associated filter 134a, 134b, 134c, 134d, 134e and 134f respectively, as has been fully described in connection with Figs. 1 to 9 inclusive.

While the invention has been described in detail with respect to certain now preferred examples and embodiments of the invention it will be understood by those skilled in the art after understanding the invention, that various changes and modifications may be made without departing from the spirit and scope of the invention, and it is intended, therefore, to cover all such changes and modifications in the appended claims.

What is claimed as new and desired to be secured by Letters Patent is:

1. In a mount for photographic objectives with built-in filters selectively movable into a use position concentric with the optical axis of the objective, two rings disposed within the mount concentric with the optical axis of the objective, one of said rings being fixedly and the other rotatably mounted, a plurality of carriers carrying different filters having different time extension factors pivotally supported on one of said rings in positions circumferentially spaced about the said optical axis, and control means controlled by the relative rotational position of the two rings and operatively coupled with each of said filter carriers for selectively pivoting, by a rotation of the rotatable ring, any one of said filter carriers either into the use position or into a position outside the incident light beams through the objective, the said control means comprising a guide pin extending from each of the filter carriers pivotally supported on one of said rings, the other ring being formed with an annular guiding groove concentric with the optical axis of the objective and including a non-concentric bent-in section, the said guide pins engaging said guiding groove for controlling the pivotal positions of the filter carriers by the positions of the guide pins in the guiding groove, a filter carrier the guide pin of which engages said non-concentric groove section being in the use position and a filter carrier the guide pine of which engages the concentric groove section being in the position outside the incident light beams through the objective.

2. An objective mount as defined in claim 1, wherein the said filter carriers, the said guide pins and the said guiding groove are arranged in a spatial relationship in which not more than one guide pin can occupy said non-concentric guiding groove section whereby all the filter carriers save one are always in the said outside position.

3. An objective mount as defined in claim 2, wherein the center angle defined by the circumferential ends of the non-concentric groove section is of such width that when a guide pin occupies about the center of the said section the associated filter carrier is in its use position and that the said guide pin is moved into concentric section of the groove whereby the respective filter carrier is in its outside position before the guide pin of an adjacent filter carrier is moved into the non-concentric groove section in response to a relative rotation of the rings.

4. An objective mount as defined in claim 3, wherein a plurality of yieldable detent means are provided between the adjacent sides of said rings for yieldably retaining the said rings in a selected one of several predetermined relative positions.

5. An objective mount as defined in claim 4, wherein the said yieldable detent means comprise a plurality of circumferentially spaced notches formed in the respective side of one of the rings, a bore formed in the respective side of the other ring, and a spring loaded detention element in the said bore engageable with said notches.

6. An objective mount as defined in claim 5, wherein the number of said notches is twice the number of said filter carriers, and wherein the said notches are circumferentially so spaced that a guide pin positioned in alignment with the line bisecting the said center angle when the two rings are in one of said detained relative positions is moved out of the non-concentric groove section upon rotation of the rotatable ring through the distance of the spacing between two adjacent notches and that the guide pin of one of the adjacent filter carriers reaches the said position of alignment upon a further rotation of the rotatable ring through the distance of a second notch spacing.

7. An objective mount as defined in claim 1, wherein the ring supporting the filter carriers also supports the objective, the other ring including said guiding groove being rotatably mounted upon said objective support ring for setting the pivotal filter carriers by rotating the said other ring.

8. An objective mount as defined in claim 7, in combination with a diaphragm of the iris type including relatively movable leaves, a ring rotatably mounted upon the ring supporting the objective adjacent to the filter carrier setting ring and operatively coupled with the leaves of the diaphragm for setting the opening of the latter, the said diaphragm setting ring having thereon a diaphragm scale calibrated by uniformly spaced indicia, the circumference of the filter carrier setting ring being divided in sectors corresponding in number to the number of filter carriers, each sector including two indicia indicative of the setting of the filter carriers and also of the diaphragm opening, the said objective support ring having on a surface portion adjacent to the filter carrier setting ring a marker coacting with the said indicia included in the sectors, one of the two indicia of each sector being indicative of a position of the filter carrier setting ring in which none of the filter carriers is in the use position, the other of the said two indicia of each sector being indicative of a position of the filter carrier setting ring in which the respective filter carrier is in the use position and also indicating on the diaphragm scale of the diaphragm setting ring the time extension factor of the filter carried by the filter carrier in the aforesaid use position.

9. An objective mount as defined in claim 8, wherein the indicia on the scale of the filter carrier setting ring are differently colored in conformity with the filters carried by the respective associated filter carriers.

10. An objective mount as defined in claim 8, wherein the indicia on the filter carrier setting ring indicative of the positions of the filter carriers are in form of a line twice bent-off at a right angle, the parallel portions of the said line being displaced relative to each other in accordance with the time extension factor of the filter carried by the respective filter carrier.

11. An objective mount as defined in claim 9, wherein the indicia on the filter carrier setting ring indicative of the positions of the filter carriers are in form of a straight line with a lateral extension the length of which extension represents the time extension factor of the filter carried by the associated filter carrier.

12. An objective mount as defined in claim 1, wherein the said filter carriers are arranged in two groups axially displaced on the axis of the objective mount and circumferentially placed about the said axis, the filter carriers of the said two groups being so staggered relative one to another that a filter carrier of one group alternates with a filter carrier of the other group.

References Cited in the file of this patent

UNITED STATES PATENTS

| Number | Name | Date |
|---|---|---|
| 562,642 | MacDonough | June 23, 1896 |
| 1,766,637 | Hopewell | June 24, 1930 |
| 2,185,847 | Harrison et al. | Jan. 2, 1940 |
| 2,195,166 | Diggins | Mar. 26, 1940 |
| 2,386,878 | Nickerson | Oct. 16, 1945 |